United States Patent [19]
Morin

[11] Patent Number: 4,942,090
[45] Date of Patent: Jul. 17, 1990

[54] CHAFF COMPRISING METAL COATED FIBERS

[75] Inventor: Louis G. Morin, Tarrytown, N.Y.

[73] Assignee: American Cyanamid

[21] Appl. No.: 14,464

[22] Filed: Apr. 24, 1987

Related U.S. Application Data

[60] Division of Ser. No. 630,709, Jul. 13, 1984, Pat. No. 4,852,453, Continuation-in-part of Ser. No. 541,611, Oct. 13, 1983, abandoned.

[51] Int. Cl.[5] ...... B32B 9/00
[52] U.S. Cl. ...... 428/367; 428/378; 428/389; 428/401
[58] Field of Search ...... 428/367, 375, 379, 389, 428/401; 343/18 R, 18 E

[56] References Cited

U.S. PATENT DOCUMENTS

| | | | |
|---|---|---|---|
| 3,535,093 | 10/1970 | Sara | 428/367 X |
| 3,622,283 | 11/1971 | Sara | 428/367 X |
| 3,821,024 | 6/1974 | Wilkin et al. | 428/367 X |
| 4,132,828 | 1/1979 | Nakamura | 428/389 X |
| 4,162,209 | 7/1979 | Butler | 204/192.14 |
| 4,371,874 | 2/1983 | Bloom | 342/12 |
| 4,481,249 | 11/1984 | Ebneth et al. | 428/367 X |
| 4,600,642 | 7/1986 | Lodge et al. | 428/367 |

FOREIGN PATENT DOCUMENTS

| | | |
|---|---|---|
| 1325794 | 8/1973 | United Kingdom . |
| 2112214 | 7/1983 | United Kingdom . |

OTHER PUBLICATIONS

Butters Article—"Chaffs as Reflectors of Radar Waves", IEE PROC., vol. 129, Pt. F, No. 3, Jun. 1982.

*Primary Examiner*—Stephen J. Lechert, Jr.
*Attorney, Agent, or Firm*—Steven Flynn

[57] ABSTRACT

High strength composite fibers are disclosed comprising a core, e.g., of carbon or the like, and a thin and uniform, firmly adherent electrically conductive layer of an electrodepositable metal, e.g., of nickel or the like. The composite fiber can be produced by electrodeposition from an electrolyte onto the core but the procedure must use external voltages high enough both (i) to dissociate the metal at the core and (ii) to nucleate the metal through the boundary layer into direct contact with the core. Such composite fibers are chopped to shortened lengths to provide chaff, which is effective as a radar countermeasure.

26 Claims, 2 Drawing Sheets

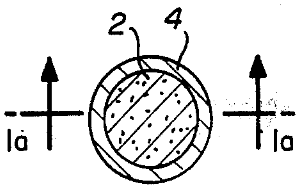
FIG. 1
FIG. 3
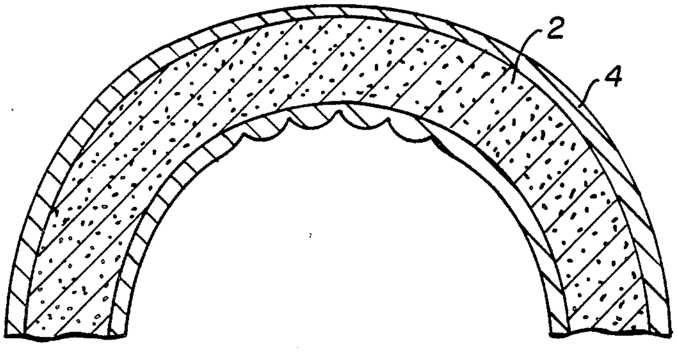
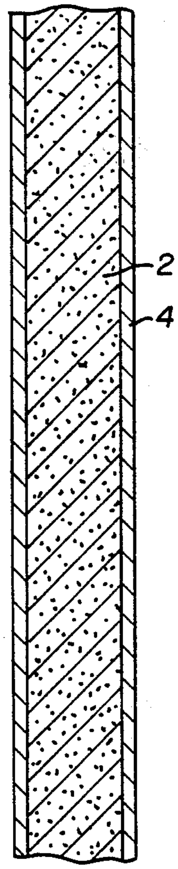
FIG. 1a
FIG. 3a
(PRIOR ART)
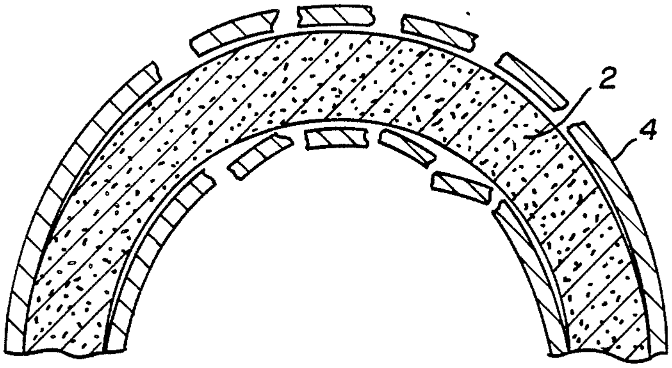
FIG. 2
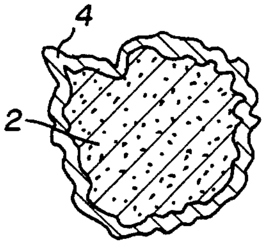
FIG. 2a
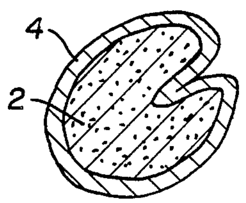

CHAFF COMPRISING METAL COATED FIBERS

This is a divisional of application Ser. No. 630,709 filed July 13, 1984, U.S. Pat. No. 4,852,453, which is a continuation-in-part of commonly assigned copending U.S. application Ser. No. 541,611, filed Oct. 13, 1983, abandoned.

The present invention relates to continuous composite fibers comprising semi-metallic cores coated with thin adherent layers of conductive metals, to methods for their production, and to chopped lengths of such fibers, useful as strategic chaff.

BACKGROUND OF THE INVENTION

In copending U.S. application Ser. No. 541,611 filed Oct. 13, 1983, now abandoned incorporated herein by reference, it is disclosed that non-metal or semi-metal fibers, such as carbon fibers, may be uniformly coated with a metal layer which is thin, continuous, and exhibits a high metal-to-core bond strength. Such metal coated fibers in the form of filaments, mats, cloths and chopped strands are disclosed therein to be useful in reinforcing metals and plastics including aluminum, steel, titanium, vinyl polymers, nylons, polyesters, etc., for use in aircraft, automobiles, office equipment, sporting equipment and other fields; and now it has been discovered that chopped lengths of such metal coated fibers, due to several inherent physical and electrical properties, are well-suited for use as chaff, i.e., dipoles or passive and active reflectors that give return readings on radar equipment, and may thus serve, e.g., as an electronic decoy.

A brief history and summary of the principles of microwave reflection by chaff is given by Butters, B. C. F., "Chaff", I.E.E. PROC., Vol. 129, Part F, No. 3, pp. 197–201 (June 1982). Dr. Butters identifies 3 principal chaff types: silver coated nylon, shredded aluminum foil, and aluminized glass. Each has disadvantages, e.g., silver coated nylon is expensive and difficult to manufacture in diameters less than about 90 microns, and shredded aluminum and aluminized glass have a comparatively high bulk density compared to silver coated nylon, have high contact resistance, and are more susceptible than silver coated nylon to distortion in manufacturing or when dispersed. However, the relatively slow rate of descent when dispersed, the high conductivity of aluminum, and the comparative ease and low cost of manufacture make aluminized glass the favored chaff material; and it is pointed out that other substrates, specifically carbon or graphite fibers, have not been successfully used for chaff because they are difficult to adherently coat with metals, and uncoated they are too resistive, to be efficient chaff.

It has now been discovered that the metal coated fibers produced in accordance with this inventor's discovery disclosed in U.S. application Ser. No. 541,611, filed Oct. 13, 1983, exhibit unexpectedly even and adherent metal coatings, and, as additionally disclosed herein, chopped lengths of such metal coated fibers are superior materials for use as chaff.

Several techniques have been developed for metal coating semi-metallic core fibers such graphite, however they have proved only marginally successful, largely due to the boundary layers present on such fibers.

High strength carbon fibers are made by heating polymeric fiber, e.g., acrylonitrile polymers of copolymers, in two stages, one to remove volatiles and carbonize and another to convert amorphous carbon into crystalline carbon. During such procedure, it is known that the carbon changes from amorphous to crystalline form, then orients into fibrils. If the fibers are stretched during the graphitization, then high strength fibers are formed. This is critical to the formation of the boundary layer, because as the crystals grow, there are formed high surface energies, as exemplified by incomplete bonds, edge-to-edge stresses, differences in morphology, and the like. It is also known that the new carbon fibrils in this form can scavenge nascent oxygen from the air, and even organic materials, to produce non-carbon layers which are firmly and chemically bonded thereto, although some can be removed by solvent treating, and there are some gaps or open spaces in the boundary layers. Not unlike the contaminants on uncleaned, unsized glass filaments, these boundary layers on carbon fibers are mainly responsible for the failure to achieve reinforcement with plastics and metals, and contribute to the high electrical resistance and poor current carrying abilities of carbon fibers as compared with metals.

Numerous unsuccessful attempts have been reported to provide such filaments, especially carbon filaments, with uniform adherent conductive coatings. Most have involved depositing layers of metals, especially nickel and copper as thin surface layers on the filaments. The metals in the prior art procedures have been vacuum deposited, electrolessly deposited, and electrolytically deposited, but the resulting composite fibers were not suitable.

Vacuum desposition, e.g., of nickel, on carbon fibers according to U.S. Pat. No. 4,132,828 (Nakamura et al.), gives an apparently continuous coating, but the vacuum deposited metal first touches the fibrils through spaces in the boundary layer, then grows outwardly like a mushroom, the coating growing away from the surface, as observed under a scanning electron microscope. The deposits are also only "line-of-sight", not penetrating to sub-surface fibers in a yarn or cloth. This is known as nodular nucleation. If the fiber is twisted, such a coating will fall off. The low density non-crystalline deposit limits use.

Electroless nickel baths have also been employed to plate such fibers, but again there is the same problem: The initial nickel or other electroless metal seeds only small spots, through holes in the boundary layer, then new metal grows up like a mushroom and joins into what appears to be a continuous coating, but it too will fall off when the fiber is twisted. The intermetallic compound is very locally nucleated, and this too limits use. In the case of both vacuum deposition and electroless deposition, the strength of the metal-to-core bond is always substantially less than that of the tensile strength of the metal deposit itself.

Finally, electroplating with nickel and other metals, to provide carbon fibers with a metal layer and achieve compatibility with metals and plastics, is reported in U.S. Pat. No. 3,622,283 (Sara). Short lengths of carbon fibers are clamped in a battery clip, immersed in an electrolyte, and by continuously reversing end on end are electroplated with nickel. When fibers produced by such a process are sharply bent, on the compression side of the bend there appear a number of transverse cracks and on the tension side of the bend the metal breaks and flakes off. If the metal coating is mechanically stripped, and the reverse side is examined under a high-power microscope, there is either no replica or at best only an incomplete replica of the fibril, the replica defined to the 40 Angstrom resolution of the scanning electron microscope. The latter two observations are strongly suggestive that failure to reinforce the matrix was due to poor bonding between the carbon and the nickel plating due to a very localized nucleation that became the site for further growth of the coating. In such cases, the metal-to-core bond strength is also only a fraction of the tensile strength of the metal coating.

It has now been discovered that where electroplating is the coating technique selected, if a very high order of external voltage is applied, much higher than was thought to be achievable in the prior art, then uniform, continuous, adherent, thin metal coatings can be provided to reinforcing fibers, especially carbon fibers. The voltage must be high enough to provide energy sufficient to push the metal ions through the boundary layer to provide uniform nucleation with the fibrils directly.

Composite fibers comprising the thin and uniform metal coatings on fibers, and yarns or tows, woven cloth, and the like including such fibers prepared according to this invention, can be knotted and folded without the metal flaking off. The composite fibers can be sharply bent without producing either transverse cracking ("alligatoring") on the compression side of the bend, or breaking and flaking when the elastic limit of the metal is exceeded on the tension side of the bend. In other words, the composite fibers of the present invention are distinguishable from those of the prior art because they are continuous and the composite fibers have a thin and uniform metal coating. Additionally, the bond strength (metal-to-core) on the fibers is high. The high metal-to-core bond strengths are not critical for the suitability of the metal coated fibers of this invention for chaff, but such bond strengths are a distinction between such materials and the prior art. Metal-to-core bond strengths approaching the tensile strength of the metal can be achieved herein.

Chaff produced from such metal coated fibers has several advantages. For example, a wide range of conductive metals and combinations of such metals can be used, and coated strands can be chopped at various lengths (in relation to the operating radar frequencies the chaff is used against). In addition the metal coated fibers of the invention can be of a particular light weight, enhancing its effectiveness as chaff.

BRIEF DESCRIPTION OF THE DRAWINGS

The invention may be more readily understood by reference to the accompanying drawings in which:

FIG. 1 is a transverse cross sectional view of a metal coated fiber of this invention.

FIG. 1*a* is a longitudinal cross sectional view of a metal, coated fiber according to this invention.

FIG. 2 and 2*a* are transverse cross sectional views of, respectively, a multinodal core and a "cracked" core fiber coated with metal according to this invention.

FIG. 3 shows a longitudinal cross section of sharply bent metal coated fiber according to this invention; and FIG. 3*a* shows a longitudinal cross section of a sharply bent metal coated composite prepared according to the prior art.

All the drawings represent models of the articles described.

SUMMARY OF THE INVENTION

According to the present invention, continuous high strength composite fibers are provided, which fibers comprise a core and at least one thin and uniform, firmly adherent, electrically conductive layer of at least one electrodepositable metal. The bond strength in each fiber is at least sufficient to provide that when the fiber is bent sharply enough to break the coating on the tension side of the bend because its elastic limit is exceeded, the coating on the compression side of the bend will remain bonded to the core and will not crack circumferentially.

Contemplated for the core fiber herein are non-metallic and semi-metallic fibers, especially carbon fibers and graphite fibers. Carbon fibers are preferred.

Figure 4:
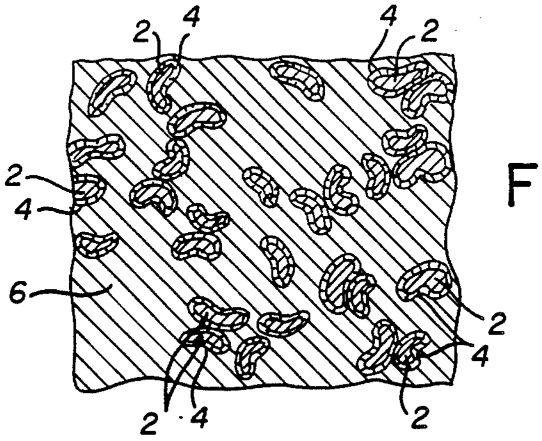
FIG. 4 is a partial sectional view of metal coated composite fibers according to the present invention embedded in a polymer matrix.

Another characteristic feature of the composite fibers is that the metal coating is thin and uniform. For example, in observing a large number of coated fibers in section, as illustrated in FIG. 4, a great majority of the composite fibers of the present invention exhibit thinly plated metal coatings, the coatings are continuous (completely bonded to the core circumferentially), and the uniformity of the metal coating, in terms of the plating thickness (which may be controlled, e.g., from about 0.03 to about 10 microns) and the continuity, from fiber to fiber, is very high (e.g., averaging about 95%). Also, aggregation (more than one fiber encapsulated together in a metal coating) is relatively low, e.g., averaging less than 10% and often substantially less than 10%.

Preferred composite fibers will be those in which, when the coating is removed by mechanical means and examined, there will be a replica of the fiber or fibril surface on the innermost surface of the removed coating, as examined under a scanning electron microscope of a resolution of about 40 Angstroms or better.

Among the features of the invention are knottable composite fibers, chopped strands of such fibers and articles, and specifically chaff comprising such fibers chopped to lengths relative to the wavelength of the radar frequency or frequencies the chaff is intended to be a countermeasure against (typically ½ the wavelength of the radar frequency and in some cases the full wavelength for very high frequency radars).

Preferred coating metals for chaff include nickel, silver, zinc, copper, lead, iron, or the mixture or alloys of any of the foregoing, without limitation, preferably in crystalline form. Metals may be selected with regard to conductivity, contact resistance, galvanic couples, specific gravity, conversion to various salts, ability to retain organic films, etc., depending on specific properties obtained and desired use. Thus, other metals and combinations thereof are contemplated within the scope of the present invention. Oxides of such metals are also contemplated, for example copper oxide, to provide chaff additionally capable of becoming an infrared decoy.

In another principal aspect, the present invention contemplates a process for the production of continuous high strength composite fibers, said process comprising:

(a) providing a plurality of continuous, high strength, semi-metallic core fibers, (b) immersing at least a portion of the length of said fibers in a bath capable of electrolytically depositing at least one electrically conductive metal thereon, (c) applying an external voltage between the fibers and the bath in excess of that sufficient to (i) dissociate the particular metal and (ii) uniformly nucleate the dissociated metal through any barrier layer onto the surface of said fibers; and (d) maintaining said voltage for a time sufficient to produce a thin, uniform, firmly adherent, electrically conductive layer of electrolytically deposited metal on said core.

While the above technique is suitable for the treatment of various different fibers, the use of carbon fiber is especially contemplated for chaff.

Other preferred features comprise the steps of chopping the coated fibers into shortened lengths, to produce a plurality of chaff dipoles.

DETAILED DESCRIPTION OF THE INVENTION

Referring to FIGS. 1 and 1*a*, continuous high strength fibers for use in the core 2 according to the present invention are available from a number of sources commercially. For example, suitable carbon fibers are available from Hercules Company, Celanese Corp., Great Lakes Carbon Company, Union Carbide Corp. and similar sources in the United States and overseas. All are made, in general, by procedures described in U.S. Pat. No. 3,677,705. For coating, the fibers can be long and continuous or they can be short, and can be individual fibers or in the form of yarn or tows, i.e., spun or simply gathered bundles of fibers. As mentioned above, such carbon fibers will contain a thin, imperfect boundary layer (not shown) of chemically bonded oxygen and chemically or mechanically bonded other materials, such as organics.

Metal layer 4 will be of any electrodepositable metal, and it will be electrically continuous but may be overlaid with less conductive oxides. Two layers, or even more, of metal can be applied, and the metals can be the same or different, or alloys, as will be shown in the working examples. In any case, the innermost layer will be so firmly bonded to core 2 that sharp bending will neck the metal down as shown in FIG. 3, snapping the fiber core and breaking the metal on the tension side of the bend when its elastic limit is exceeded. This is accomplished without causing the metal to flake off when broken (FIG. 3*a*), which is a problem in fibers metal coated according to the prior art. As a further distinction from the prior art, the metal layer of the present invention fills interstices and "cracks" in the fibers, uniformly and completely, as illustrated in FIGS. 2 and 2*a*.

Formulation of the metal coating layer by the electrodeposition process of this invention can be carried out in a number of ways. For example, a plurality of core fibers can be immersed in an electrolytic bath and through suitable electrical connections the required high external voltage can be applied. In one manner of proceeding, a high order of voltage is applied for a short period of time. A pulse generator, for example, will send a surge of voltage through the electrolyte, sufficient to push or force the metal ion through the boundary layer into contact with the carbon or other fiber comprising the cathode. Because the fibers are so small, e.g., 4 to 10 microns in diameter, and because the innermost fibers are usually surrounded by hundreds or even thousands of others, even though only 0.5 to 2.6 volts are needed to dissociate the electrolytic metal ion, e.g., nickel, silver, copper, depending on the salt used, massive amounts of external voltage are needed to uniformly nucleate the ions through the bundle of fibers into the innermost fibril and then through the boundary layer. Commonly external voltages of, e.g., 10 to 50, or even more, volts are necessary.

Figure 5:
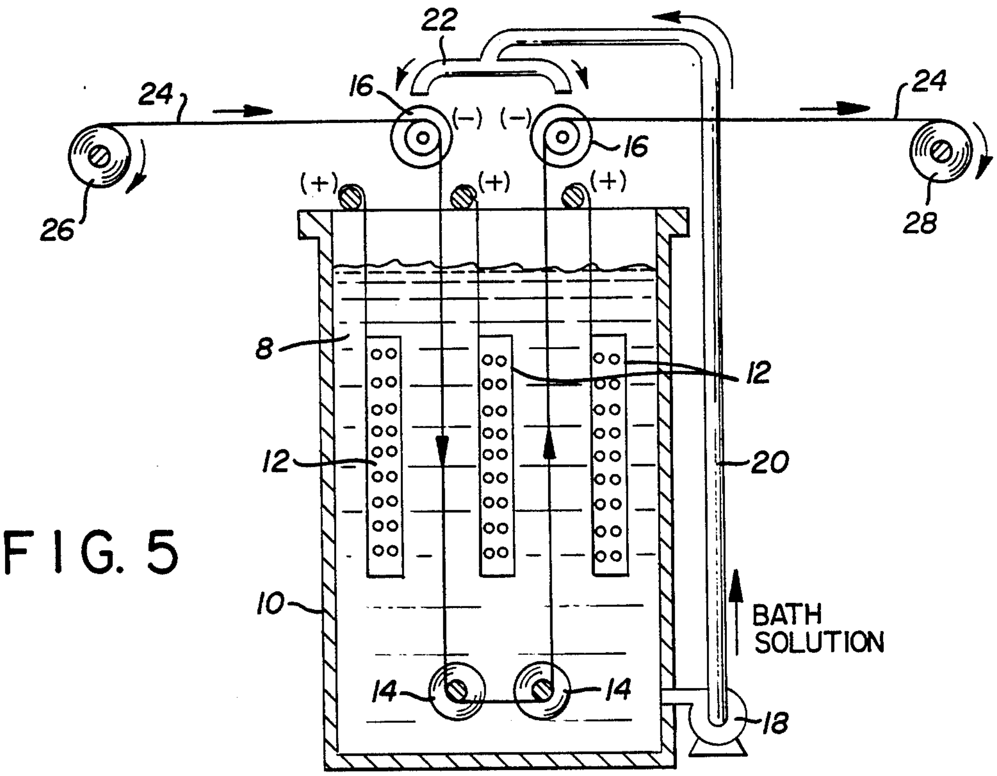
FIG. 5 is a view showing an apparatus for carrying out the process of the present invention.

Although pulsing as described above is suitable for small scale operations, for example, to metallize small lengths of carbon fibers, yarns or tows, it is preferred for large scale production to carry out the procedure in a continuous fashion on a moving tow of fibers. To overcome the problem of fiber burnout because of the high voltages, it is preferred to operate in an apparatus shown schematically in FIG. 5. Electrolytic bath solution 8 is maintained in tank 10. Also included are anode baskets 12 and idler rolls 14 near the bottom of tank 10. Two electrical contact rollers 16 are located above the tank. Tow 24 is pulled by means not shown off feed roll 26, over first contact roller 16 down into the bath under idler rolls 14, up through the bath, over second contact roller 16 and into take-up roller 28. By way of illustration, the immersed tow length is about 6 feet. Optional, but most preferred, is a simple loop comprising pump 18, conduit 20, and feed head 22. This permits recirculating the plating solution at a large flow rate, e.g., 2–3 gallons/min. and pumping it onto contact rolls 16. Discharged just above the rolls, the sections of tow 24 leaving the solution are totally bathed, thus cooling them. At the high current carried by the tow, the $I^2R$ heat generated in some cases might destroy them before they reach or after they leave the bath surface without such cooling. The flow of the electrolyte overcomes anisotropy and contact resistance. Of course, more than one plating bath can be used in series, and the fibers can be rinsed free of electrolyte solution, treated with other conventional materials and dried, chopped, all in accordance with conventional procedures.

Chaff according to the present invention is prepared by chopping stands of composite fibers metal coated as described above into lengths designed to effectively reflect impinging radar waves. Preferably, the fibers are cut to a length roughly ½ the wavelength of the radar frequency the chaff is intended to be used against or, where very high radar frequencies are encountered, full wavelengths.

In practice, a radar operator may be monitoring several frequencies, currently in the 2–20 GHz range. In the future, radars may be developed using much higher frequencies. An advantage of the chaff of the present invention is that it can be adapted to the present and contemplated radar frequencies. Therefore, while present strategic chaffs may contain different lengths of filament ranging from several centimeters and shorter (e.g., 0.01–10 cm), corresponding to the halfwave lengths (or full wavelengths) over an entire bandwidth, the range that may be achieved with the chaff of this invention is from 100 microns to hundreds of meters, depending on the specific use contemplated. However, if the particular impinging frequency to be defended against is known, the chaff may be "tuned" by increasing the proportion of chaff dipoles reflecting that particular frequency, and many more dipoles per unit volume of chaff may be dispersed.

Chaff prepared in accordance with the present invention is highly efficient in comparison with previously known chaff materials because the coating is continuous and of high purity.

In addition, due to the core material, the chaff fibers are much stiffer than prior materials, which facilitates dispersion. This ensures that the dipole length will remain tuned to the object radar frequency.

The dispersibility of the chaff may be assisted by further treatment of the fibers before chopping into strands to make them mutually repellant, or at least non-adhesive. For example, rinsing the coated fiber with a solution to change the surface qualities of the chaff dipoles is a typical method. In the case of several of the preferred embodiments of this invention, e.g., nickel, silver or lead coated carbon fiber, sizing the coated fiber with a solution of oleamide in 1,1,1-trichloroethane (e.g., about 10 g/l) has been found to provide a hydrophobic and slippery surface and greatly aid dispersion of the chaff. After the sizing dries and fuses, the plated, sized tow of fibers is typically pulled through a series of rollers or rods ("breaker bars") to break apart fibers stuck together by the sizing. This also is a means of maintaining collimation of the fibers. Other rinses or sizings, as well as other treatments to aid chaff dispersion, will be readily apparent to persons skilled in the art and are fully contemplated herein.

When broad band reflection is desired a certain amount of contact between individual chaff dipoles may be advantageous. Because contact between two chaff dipoles according to the present invention creates an effective longer dipole, controlled contact provides larger dipoles that respond at different frequencies as the chaff disperses and the individual dipoles separate. This is another method of "tuning" the chaff to the radar, made possible by the present invention. Also, core fibers such as graphite fiber are available in various shapes, e.g., X or Y shapes, permitting multilobal radar reflection.

A further advantage of the composite fiber chaff herein is its low bulk density.

A chaff bundle may also contain a mixture of differently coated chaffs, which gives a radar response markedly different from conventional chaff. Varied responses from mixed chaffs can cause confusion if not deception of radar operators, or can cause delays in computer-assisted analysis of radar signals.

The small comparative diameters of fibers contemplated herein permit chopping to very short lengths, e.g., 100 microns, so as to be effective against super high frequency radars. Also, broad band reflection is within the scope of the present invention. Further contemplated within the scope of the invention are magnetic coatings, such as nickel, iron, and nickel/iron alloys, and "active" chaff, generating galvanic values, for example, zinc over graphite fiber (or nickel coated graphite), which will create a battery effect under the proper humidity conditions (e.g., rain or an electrolyte included in the chaff package).

DESCRIPTION OF THE PREFERRED EMBODIMENTS

The following Examples illustrate the present invention, but are not intended to limit it.

EXAMPLE 1

In a continuous electroplating system, a bath is provided having the following composition:

| Ingredient | Amount |
|---|---|
| Nickel Sulfate ($NiSO_4 \cdot 6H_2O$) | 40 ounces/gallon |
| Nickel Chloride ($NiCl_2 \cdot 6H_2O$) | 12–20 ounces/gallon |

-continued

| Ingredient | Amount |
|---|---|
| Boric Acid ($H_3BO_3$) | 5–8 ounces/gallon |

The bath is heated to 140°–160° F. and has a pH of 3.8–4.2.

The anode baskets are kept filled with electrolytic nickel pellets and 4 tows (fiber bundles) of 12,000 strands each of 7 micron carbon fibers are continuously drawn through the bath while an external voltage of 30 volts is applied at a current adjusted to give 10 ampere-minutes per 1000 strands total. At the time, electrolytic solution is recycled through a loop, into contact with the entering and leaving parts of the tow. The tow is next passed continuously through an identical bath, at a tow speed of 5.0 ft./min. with 180 amps. current in each bath. The final product is a tow of high strength composite fibers according to this invention comprising a 7 micron fiber core and about 50% by weight of the composite of crystalline electrodeposited nickel adhered firmly to the core.

The metallurgical properties of the coating can be controlled by adjusting the temperature and pH of the bath. For example, for stiffness, the same bath at 80°–100° F. and pH 5.2 can be employed.

Chopped strands of such materials can be used as chaff.

If a length of the fiber is sharply bent, then examined, there is no circumferential cracking on the metal coating in the tension side of the bend. The tow can be twisted and knotted without causing the coating to flake or come off as a powder. If a section of the coating is mechanically stripped from the fibrils, there will be a perfect reverse image (replica) on the reverse side.

EXAMPLE 2

If the procedure of Example 1 is repeated using nickel coated graphite fibers, substituting two baths of the following compositions, in series, and using silver in the anode baskets, silver coated fibers according to this invention will be obtained. Chopped strands of such materials can be used as chaff.

| Ingredient | First Bath | Second Bath |
|---|---|---|
| Silver Cyanide | 0.1–0.3 oz./gal. | 7–11 oz./gal. |
| Potassium Cyanide | 12–20 oz./gal. | 12 oz./gal. |
| Potassium Hydroxide | — | 1–2 oz./gal. |

The first bath can be operated at room temperature and 12–36 volts; the second at room temperature and 6–18 volts.

EXAMPLE 3

The procedure of Example 1 can be modified by substituting for the nickel bath two baths of the following composition, using standard 80% cu/20% zinc anodes, and brass coated graphite fibers according to this invention will be obtained.

| Ingredient | Amount |
|---|---|
| Copper Cyanide | 4 oz./gal. |
| Zinc Cyanide | 1.25 oz./gal. |
| Sodium Cyanide | 4 oz./gal. |

Both baths are run at 110°-120° F. Since one-third of the brass is plated in the first bath, at 24 volts, and two-thirds in the second at 15 volts, the current is proportioned accordingly. Following two water rinses, the brass plated fibers are washed with a solution of pH 3 phosphoric acid to prevent tarnishing, and then rinsed twice again with water.

EXAMPLE 4

The procedure of Example 1 can be modified by substituting for the nickel bath a bath of the following composition, using solid lead bars in the anode baskets, and lead coated graphite fibers according to this invention will be obtained.

| Ingredient | Amount |
|---|---|
| Lead Fluoroborate, $Pb(BF_4)_2$ | 14 oz. Pb/gal. |
| Fluoroboric Acid, $HBF_4$ | 13 oz./gal. |

Optionally, about 2 g/l of β-naphthol and of gelatine are added. The pH is less than 1, the bath is operated at 80° F. and an external voltage of 12 volts is applied. If the coating thickness exceeds 0.5 microns, there is a tendency for the lead to bridge between individual filaments. The same procedure can be used to coat lead onto nickel coated graphite fibers.

EXAMPLE 5

By the general procedure of Example 1, and substituting a conventional mixed chloride iron bath for the nickel electroplating bath and applying sufficient external voltage, composite high strength fibers comprising iron on graphite fibers are obtained.

The foregoing patents and publications are incorporated herein by reference. It will be understood that chopped lengths of any of the coated fibers exemplified above or disclosed herein will be useful as chaff. Many variations of the present invention will suggest themselves to those skilled in this art in light of the above, detailed description. For example, aluminum can be deposited from ethereal solutions. Metals, e.g., tungsten, can be deposited from molten salt solutions, e.g., sodium tungstenate. The tow can be treated to remove metal from sections thereof, to alter effective dipole lengths. Chaff for reflecting electromagnetic waves other than those used in radar is also contemplated: Thus, lead-over-nickel coated graphite or lead coated graphite are effective as hard radiation blockers; copper and black oxide (e.g., EBENAL C, Ethone, Inc.) coated carbon fiber chaff may be an effective infrared absorber; and nickel coated carbon fiber chaff may be used as a wide-area laser beam or particle beam reflector. All such variations are within the full intended scope of the invention as defined in the appended claims.

What is claimed is:

1. Continuous composite fibers, each comprising a semi-metallic core and at least one thin and uniform, firmly adherent, electrically conductive layer of at least one metal on said core, said composite fibers having been chopped into lengths corresponding to the wavelength of one or more radar frequencies.

2. Continuous composite fibers as defined in claim 1 wherein the bond strength of said layer to said core is at least sufficient to provide that when the composite fiber is bent sharply enough to break the coating on the tension side of the bend because its elastic limit is exceeded, the coating on the compression side of the bend will remain bonded to the core and the coating will not crack circumferentially.

3. Continuous composite fibers as defined in claim 1 wherein said core comprises carbon or graphite.

4. Continuous composite fibers as defined in claim 2 wherein said core comprises carbon fibers.

5. Continuous composite fibers as defined in claim 4 wherein removal of the coating by mechanical means provides a replica of the fibril surface on the, inner surface of the removed coating.

6. Continuous composite fibers as defined in claim 1 which can be knotted without substantial separation and loss of said metal coating.

7. A composition of matter comprising chopped composite fibers as defined in claim 1.

8. Composite fibers as defined in claim 1 wherein said metal comprises nickel, silver, zinc, copper, lead, tin, iron, or alloys of any of the foregoing.

9. Chaff comprising composite fibers as defined in claim 1 chopped into one or more lengths.

10. Chaff comprising chopped composite fibers as defined in claim 1, wherein the core is carbon fiber and the metal coating comprises nickel, silver, lead, zinc, copper, oxides thereof, combinations thereof, or more than one layer of the same or different such metals.

11. Continuous composite fibers, each comprising an electrically conductive semi-metallic substantially undegraded core and at least one thin and uniform, firmly adherent, electrically conductive layer of at least one metal on said core.

12. Continuous composite fibers as defined in claim 11 wherein said metal is a high voltage electrodeposited metal.

13. Continuous composite fibers as defined in claim 12 wherein said layer has been electrodeposited at an applied external voltage in excess of 10 volts while maintaining the fibers cool enough outside the bath to prevent degradation of said fibers.

14. Continuous composite fibers as defined in claim 13 wherein the applied external voltage is between 10 and 50 volts.

15. Continuous composite fibers as defined in claim 14 wherein the applied external voltage is between 12 and 36 volts.

16. Continuous composite fibers as defined in claim 15 wherein the applied external voltage is in excess of 13 volts.

17. Continuous composite fibers as defined in claim 13 wherein the fibers are cooled by means outside the bath so that fiber degradation is substantially avoided.

18. Continuous composite fibers as defined in claim 17 wherein the fibers are cooled by recycling the bath into contact with the fibers prior to immersion therein so as to provide increased current carrying capacity to the fibers and replenishment of the electrolyte on the surface of the fibers therein.

19. Continuous composite fibers as defined in claim 18 wherein the applied external voltage is in the range of 10 to 50 volts.

20. Continuous composite fibers as defined in claim 19 wherein the applied external voltage is in the range of 12 to 36 volts.

21. Continuous composite fibers as defined in claim 20 wherein the applied external voltage is in excess of 30 volts.

22. Continuous composite fibers as defined in claim 13 wherein said core fibers comprise carbon fibers.

23. Continuous composite fibers as defined in claim 17 wherein the composite fibers can be knotted without separation of the layer of metal or portions thereof from the core fibers.

24. Continuous composite fibers as defined in claim 17 wherein the bond strength of said layer to said core in the majority of said fibers is at least sufficient to provide that when the composite fiber is bent sharply enough to break the coating on the tension side of the bend because its elastic limit is exceeded, the coating on the compression side of the bend will remain bonded to the core and will not crack circumferentially.

25. Chaff comprising composite fibers as defined in claim 11 chopped into one or more lengths.

26. Chaff comprising composite fibers as defined in claim 11 chopped into lengths relative to the wavelength of one or more radar frequencies.

* * * * *